United States Patent Office 3,071,586
Patented Jan. 1, 1963

3,071,586
PREPARATION OF TRIARYLTRIAZINES
Walter J. Sandner, Carpentersville, and William L. Fierce, Crystal Lake, Ill., assignors to The Pure Oil Company, Chicago, Ill., a corporation of Ohio
No Drawing. Filed Aug. 3, 1960, Ser. No. 47,148
3 Claims. (Cl. 260—248)

This invention relates to new and useful improvements in processes for the preparation of triaryltriazines, such as 2,4,6-triphenyltriazine, also known as cyaphenin, from mononuclear arylnitriles, such as benzonitrile, tolunitrile, xylonitrile, etc.

Compounds having the triazine ring structure are well known in the art as intermediates in the preparation of azo dyes and other similar materials. Cyaphenin (2,4,6-triphenyltriazine) is an intermediate compound which has been made by trimerization of benzonitrile, and also by the reaction of benzene with cyanuric chloride. There are several processes reported in the prior art for the preparation of 2,4,6-triphenyltriazine by trimerization of benzonitrile which require the use of various catalysts. This trimerization reaction does not take place in the absence of a catalyst. Kunz et al., 1,989,042, discloses the trimerization of benzonitrile in the presence of chlorosulfonic acid. Cairns et al., 2,503,999, discloses the trimerization of benzonitrile by heating in the presence of an alcohol at extremely high pressures. Mahan et al., 2,598,811, discloses a process for trimerization of benzonitrile by heating in the presence of an alklai-metal hydride or alkali-metal amide as catalyst. In Berichte, 33, 1055, a process is described for trimerization of benzonitrile by heating in the presence of aluminum chloride at 50° C. This process, however, results in the production of very small yields of cyaphenin.

It is therefore one object of this invention to provide a new and improved process for the preparation of a mononuclear triaryltriazine, such as cyaphenin, or 2,4,6-triphenyltriazine.

Another object of this invention is to provide a new and improved process for catalytic trimerization of benzonitrile to cyaphenin (2,4,6-triphenyltriazine).

A feature of this invention is the provision of an improved process for the preparation of cyaphenin or derivatives thereof, in which benzonitrile (or other arylnitrile) is heated to a temperature of about 200°–500° C. in the presence of aluminum chloride and hydrogen chloride as catalyst.

Other objects and features of this invention will become apparent from time to time throughout the specification and claims as hereinafter related.

This invention is based upon our discovery that benzonitrile (or other arylnitriles) can be trimerized to produce cyaphenin (2,4,6-triphenyltriazine), or derivatives thereof, by heating to a temperature in the range from about 200°–500° C. in the presence of a mixture of anhydrous aluminum chloride and anhydrous hydrogen chloride.

The following non-limiting examples are illustrative of the scope of this invention.

Example I

A 500-ml., three-necked flask, fitted with a condenser, thermometer, gas-bubbling tube, and heating mantle, was charged with 50 ml. (0.49 mol) of benzonitrile and 65 g. (0.49 mol) of anhydrous aluminum chloride. The mixture gave off a small amount of heat before the mantle was turned on. When the temperature of the mixture reached 100° C., all of the aluminum chloride had gone into solution. When the temperature reached 140° C., bubbling of anhydrous hydrogen chloride into the reaction liquid, at a rate of about 75 cc./min., was initiated. The temperature of the reaction mixture continued to rise from 190° C. to 285° C. over a period of two hours, after which the mantle was turned off and the reaction terminated.

The resulting, dark-colored mixture was cooled to 140° C., 200 ml. of benzene were added, and the resulting mixture was chilled to 5° C. in an ice bath. Then the cold mixture was poured over ice, with stirring, to hydrolyze the complex and destroy any excess aluminum chloride, whereupon two layers formed and were separated by means of a separatory funnel. The upper, hydrocarbon phase was washed several times with distilled water, until the final wash was neutral. After the benzene solution had been passed through filter paper, all of the liquid was removed by heating in a steam bath and stripping with nitrogen. The black solid which remained weighed 3.2 g., and was found by means of infrared analysis to contain 80% wt. cyaphenin.

The foregoing experiment was repeated, except that the reaction temperature was held at 184° C. for 2 hours, after which the product was worked up as in the foregoing experiment. Only 0.4 g. of solid product was obtained which was shown by infrared analysis to contain 85% wt. cyaphenin. This experiment demonstrates the necessity of heating the benzonitrile to a temperature in excess of 200° C., if a satisfactory yield of syaphenin is to be obtained.

Example II

The apparatus described in Example I was charged with 50 ml. (0.49 mol) of benzonitrile and the electrical heating mantle was turned on. When the temperature of the benzonitrile reached 140° C., the introduction of anhydrous hydrogen chloride, at a rate of about 100 cc./min. was initiated. The mixture was then heated and maintained at reflux temperature (190° C.) for 4½ hours. The reaction product mixture was worked up as in Example I, but a liquid product was obtained instead of the solid obtained in the previous experiment. This product weighed only 1.2 g., and was shown, by means of infrared analysis, to contain no cyaphenin.

Example III

In another experiment, an attempt was made, following prior art techniques (Ber., 33, 1055), to prepare cyaphenin from benzonitrile using only aluminum chloride as the catalyst. The apparatus described in Example I was charged with 50 ml. (0.49 mol) benzonitrile and 65 g. (0.49 mol) of anhydrous aluminum chloride. The mixture was heated at a temperature of 213°–265° C. for 2½ hours. At the end of this time, the resulting mixture was worked up as in Example I. In this experiment, a small amount of a black solid product was obtained which weighed only 1.2 g. (as compared with 3.2 g. in Example I) and was found to contain 65% wt. of cyaphenin.

From our experiments, we have found that arylnitriles can be trimerized by heating to a temperature of 200°–500° C. in the presence of a mixture of aluminum chloride and hydrogen chloride under anhydrous conditions. While benzonitrile is a preferred reactant, other arylnitriles, such as tolunitrile, xylonitrile, ethylbenzonitrile, etc., may be trimerized using the same catalyst and substantially the same reaction conditions. The amount of catalyst used is preferably maintained within fairly close limits, viz., 0.5 to 1.5 mols of aluminum chloride and 0.25 to 1.5 mols of hydrogen chloride per mol of benzonitrile. The temperature range of 200°–500° C. is relatively critical, since no substantial reaction takes place below about 200° C., and at temperatures above 500° C., some decomposition of product is encountered. While the benzonitrile, aluminum chloride, and hydrogen chloride may be merely mixed and heated, it is preferred to mix benzonitrile and aluminum chloride and heat while bubbling hydrogen chloride through the mixture.

While we have described this invention fully and completely with special emphasis upon certain preferred embodiments thereof, we wish it to be understood that within the scope of the appended claims, this invention may be practiced otherwise than as specifically described.

The embodiments of the invention in which an exclusive property or privilege is claimed are defined as follows:

1. A method of producing triaryltriazines which consists of heating one mol of a mononuclear arylnitrile containing one cyano substituent with 0.5 to 1.5 mols of aluminum chloride and 0.25 to 1.5 mols of hydrogen chloride under anhydrous conditions at a temperature of 285°–500° C.

2. A method of preparing 2,4,6-triphenyltriazine which consists of heating one mol of benzonitrile with 0.5 to 1.5 mols of aluminum chloride and 0.25 to 1.5 mols of hydrogen chloride under anhydrous conditions at a temperature of 285°–500° C.

3. A method according to claim 2 in which aluminum chloride is dissolved in benzonitrile, the solution is heated, and hydrous hydrogen chloride is bubbled therethrough.

References Cited in the file of this patent

UNITED STATES PATENTS

| | | |
|---|---|---|
| 1,989,042 | Kunz et al. | Jan. 22, 1935 |
| 2,525,714 | Norton | Oct. 10, 1950 |

OTHER REFERENCES

Cousin et al.: Bull. Soc. Chim., France, volume 15, pp. 416–8 (1914).

Johnson et al.: Jour. of the Am. Chem. Soc., vol. 44, pp. 1341–1343 (1922).

Ross et al.: Jour. of the Am. Chem. Soc., vol. 72, pp. 3302 to 3304 (1950).

Smolin et al.: "s-Triazines and Derivatives," pp. 149 to 153, Interscience Publishers Inc., N.Y., February 1959.

Bengelsdorf: Jour. of the Am. Chem. Soc., vol. 80, pp. 1442–1444 (1958).